(12) United States Patent
Peng et al.

(10) Patent No.: US 8,665,587 B2
(45) Date of Patent: Mar. 4, 2014

(54) MOUNTING APPARATUS FOR EXPANSION CARD

(75) Inventors: Wen-Tang Peng, New Taipei (TW); Guang-Yi Zhang, Shenzhen (CN); Xiao-Zheng Li, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 293 days.

(21) Appl. No.: 13/220,705

(22) Filed: Aug. 30, 2011

(65) Prior Publication Data

US 2012/0275112 A1  Nov. 1, 2012

(30) Foreign Application Priority Data

Apr. 29, 2011  (CN) .......................... 2011 1 0110486

(51) Int. Cl.
*G06F 1/16* (2006.01)
*H05K 7/14* (2006.01)
*H05K 7/00* (2006.01)
*H05K 5/00* (2006.01)
*H01R 13/62* (2006.01)

(52) U.S. Cl.
USPC ................. 361/679.32; 361/679.31; 361/801; 361/747; 361/759; 439/160

(58) Field of Classification Search
USPC ....................... 361/679.31, 679.32, 801, 802, 361/807–810, 752, 790, 747, 759; 439/160
See application file for complete search history.

(56) References Cited

U.S. PATENT DOCUMENTS

| | | | | |
|---|---|---|---|---|
| 5,594,627 A | * | 1/1997 | Le | 361/801 |
| 6,702,598 B1 | * | 3/2004 | Lo | 439/157 |
| 7,922,506 B1 | * | 4/2011 | Harlan et al. | 439/160 |
| 7,967,618 B2 | * | 6/2011 | Chang | 439/157 |
| 2002/0109977 A1 | * | 8/2002 | Megason et al. | 361/801 |
| 2003/0137811 A1 | * | 7/2003 | Ling et al. | 361/759 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A mounting apparatus having two latching members for fixing an expansion card to an expansion slot mounted on a motherboard. Two latching members are mounted to two ends of the expansion slot, for fixing the expansion card. Two latching members are pivotably sandwiched between the ends of the expansion slot and the motherboard, respectively. A latching block protrudes from each of the latching members, for abutting against a bottom of the corresponding locking member.

19 Claims, 4 Drawing Sheets

MOUNTING APPARATUS FOR EXPANSION CARD

CROSS-REFERENCE OF RELATED APPLICATION

Relevant subject matter is disclosed in a pending U.S. patent application, titled "MOUNTING APPARATUS FOR EXPANSION CARD", with the application Ser. No. 13/217,263, filed on Aug. 25, 2011, which is assigned to the same assignee as this patent application.

BACKGROUND

1. Technical Field

The present disclosure relates to mounting apparatuses, and particularly, to an apparatus for mounting an expansion card.

2. Description of Related Art

Generally, an expansion card, such as a memory card, is fixed on a circuit board of an electronic device, such as a computer or a server, by a mounting apparatus. The mounting apparatus includes an expansion slot to electrically connect the expansion card, and two locking members disposed at two opposite ends of the expansion slot for clamping two opposite ends of the expansion card. However, the expansion slot can only mount one type of expansion cards, such as memory cards. For an expansion card of a different type, such as a solid state disk card, which is larger than the expansion cards in size, when the solid state disk card is inserted into the expansion slot, the locking members cannot securely clamping two opposite ends of a lower portion of the solid state disk card.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
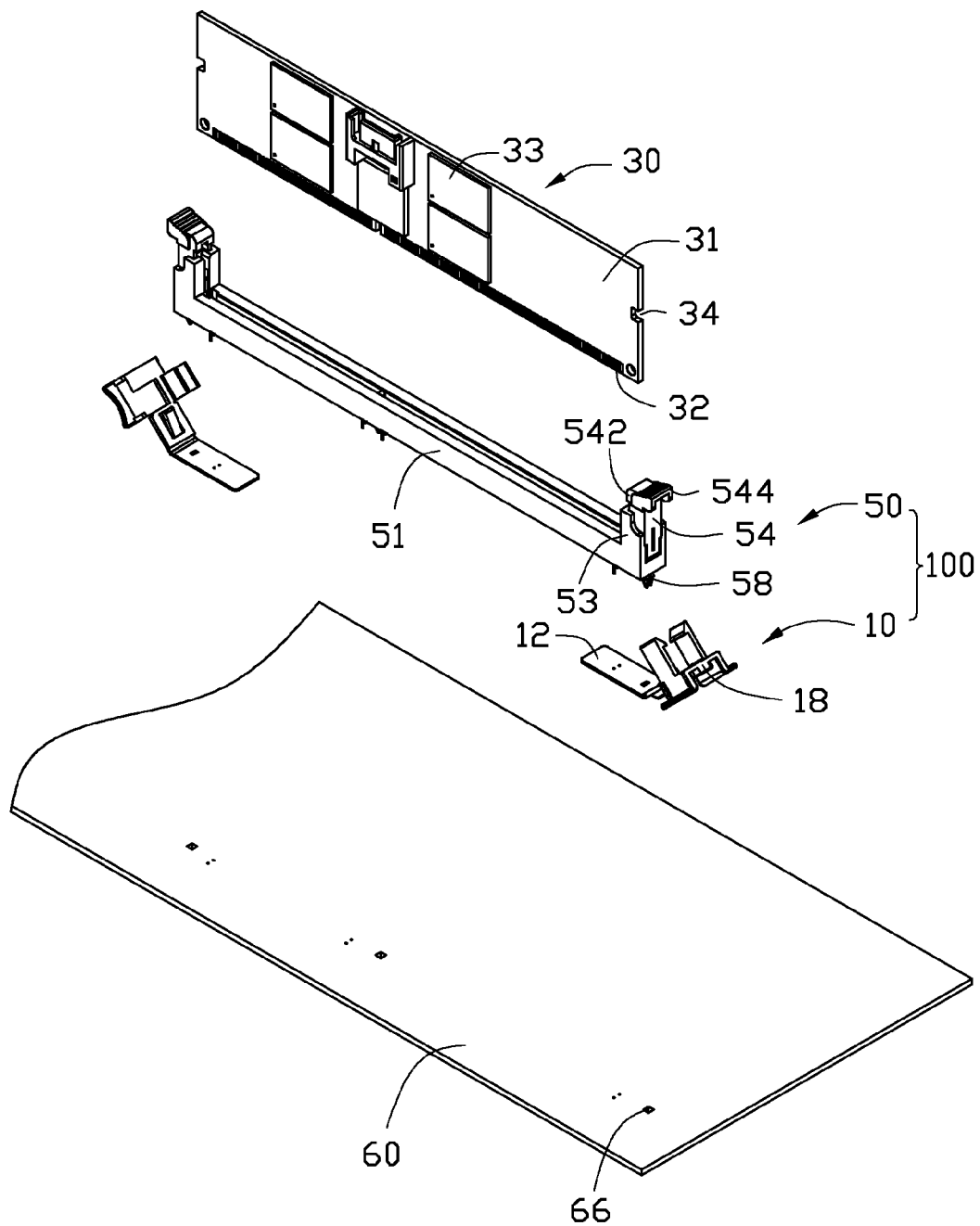
FIG. 1 is an exploded, isometric view of an exemplary embodiment of a mounting apparatus having two latching members.

Referring to FIG. 1, an exemplary embodiment of a mounting apparatus 100 is used for mounting an expansion card 30 on a motherboard 60. The mounting apparatus 100 includes an expansion slot 50, two locking members 54 mounted to opposite ends of the expansion slot 50, and two latching members 10.

The motherboard 60 defines three fixing holes 66 therein, for fixing the expansion slot 50.

The expansion card 30 includes an elongated circuit board 31. An edge connector 32 is formed on a bottom side of the circuit board 31, and a plurality of chips 33 are mounted on a surface of the circuit board 31. Two cutouts 34 are defined in two opposite ends of the circuit board 31, respectively. In the embodiment, the expansion card 30 is a solid state disk card.

The expansion slot 50 includes an elongated main body 51, and two fixing portions 53 respectively extending upward from two opposite ends of the main body 51. The locking members 54 are rotatably mounted to the fixing portions 53, respectively. Each locking member 54 includes a projection 542 extending from a top of the locking member 54 toward the other locking member 54, and an operation portion 544 extending from the top of the locking member 54 away from the projection 542. Three latching portions 58 extend downward from a bottom surface of the main body 51.

Figure 2:
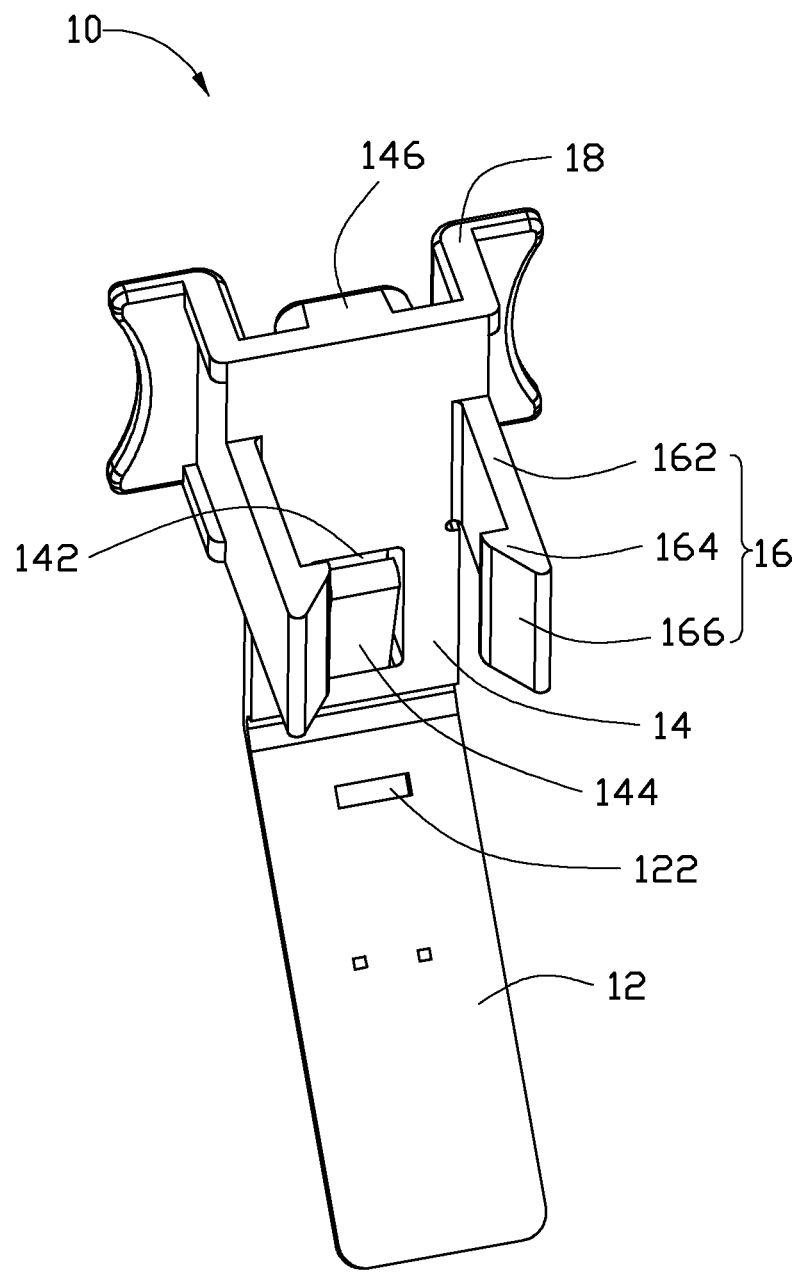
FIG. 2 is an enlarged, isometric view of one of the latching members of FIG. 1, but viewed from another perspective.

Referring to FIG. 2, each latching member 10 is substantially L-shaped, and includes a rectangular connecting plate 12, and a rectangular abutting plate 14 obliquely extending upward from an end of the connecting plate 12. An angle between the connecting plate and the abutting plate is greater than 90 degrees. A connecting hole 122 is defined in the connecting plate 12, adjacent to the abutting plate 14. Two hooks 16 extend from two opposite sides of an upper portion of the abutting plate 14, facing the connecting plate 12.

Each hook 16 includes a resilient extension plate 162 perpendicularly extending from the abutting plate 14, and a wedge-shaped latching block 164 extending from a distal end of the extension plate 162 facing the other hook 16. A slanted guiding surface 166 is formed on an outer side of each latching block 164, away from the abutting plate 14. A distance between the extension plates 162 is substantially equal to a width of the corresponding fixing portion 53. Two L-shaped operation portions 18 perpendicularly extend from the distal ends of the abutting plate 14, away from the hooks 16. A rectangular abutting block 146 extends from the upper end of the abutting plate 14, between the operation portions 18. A rectangular receiving slot 142 is defined in a middle of the abutting plate 14, adjacent to the connecting plate 12. A rectangular resilient portion 144 obliquely extends out from a bottom wall bounding the receiving slot 142, facing the hooks 16. In the embodiment, the latching member 10 is made of resilient material, such as plastic, and is integrally formed.

Figure 3:
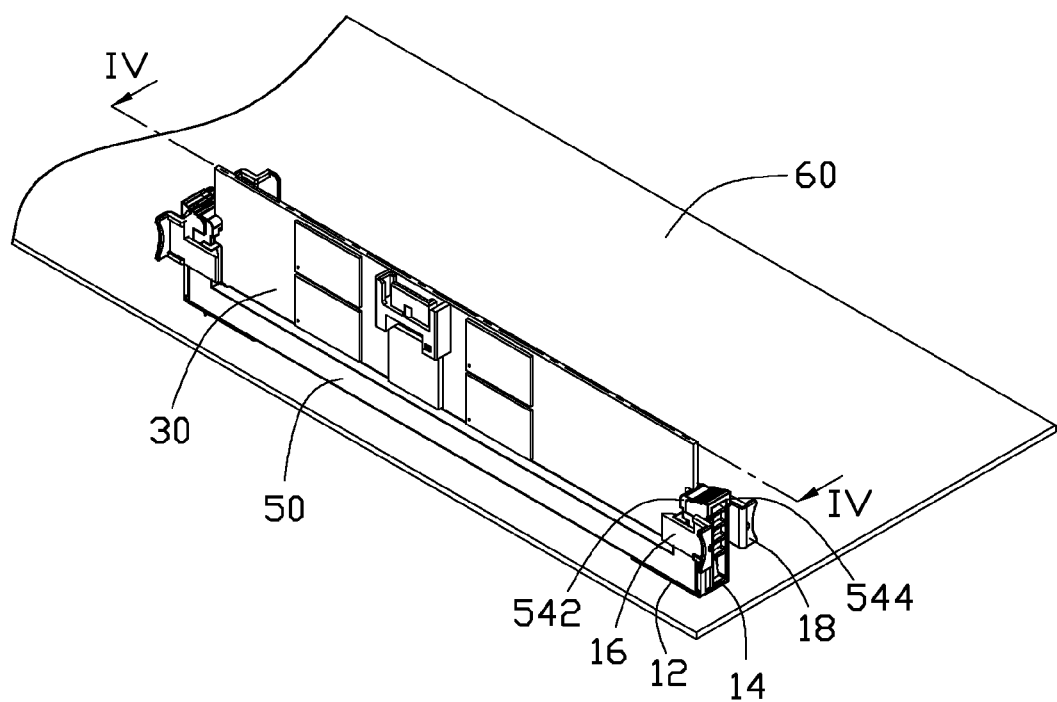
FIG. 3 is an assembled, isometric view of FIG. 1.

Referring to FIG. 3, in assembly, the latching members 10 are attached to the corresponding ends of the expansion slot 50. The latching portions 58 adjacent to two ends of the expansion slot 50 are extended through the connecting holes 122 of the corresponding latching members 10, to latch into the corresponding fixing holes 66. The third latching portion 58 is latched into the third fixing hole 66. The connecting plates 12 of the latching members 10 are sandwiched between the expansion slot 50 and the motherboard 60. Each abutting plate 14 is located at a side of the corresponding fixing portion 53 opposite to the main body 51, with the hooks 16 facing the corresponding operation portions 544. The abutting plate 14 is capable of being rotated about a junction of the connecting plate 12 and the abutting plate 14.

Figure 4:
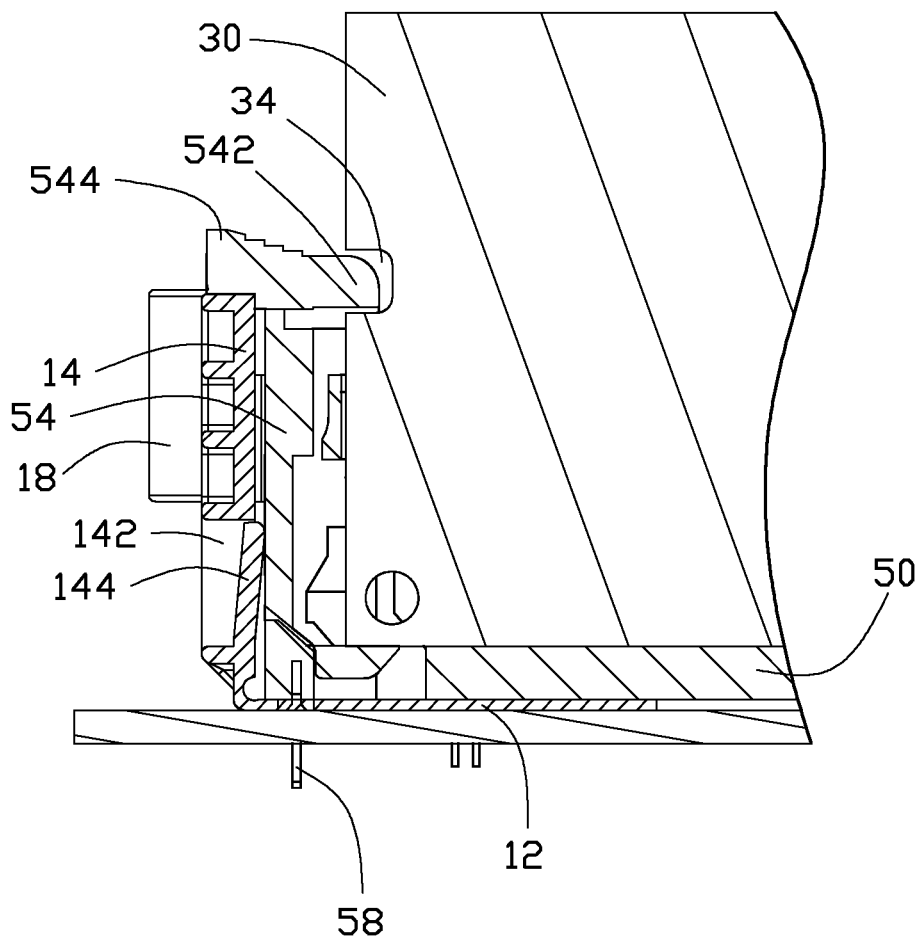
FIG. 4 is a cross-sectional view of FIG. 3, taken along the line of IV-IV.

Referring to FIG. 4, attaching the expansion card 30 to the expansion slot 50, the locking members 54 are rotated out to make the projections 542 move away from each other. The edge connector 32 is inserted into the main body 51 of the expansion slot 50. The locking members 54 are rotated back to make the projections 542 latch into the corresponding cutouts 34. Each latching member 10 is pressed toward the corresponding fixing portion 53. The abutting plate 14 is rotated, the guiding surfaces 166 engage with two opposite sides of the fixing portion 53, deforming the extension plates 162 away from each other, until the latching blocks 164 pass by the fixing portions 53. The extension plates 162 are restored to sandwich the fixing portion 53, and the latching blocks 164 latch the fixing portion 53. The resilient portion 144 of each latching member 10 abuts against the corresponding fixing portion 53, to be deformed, and received in the resilient slot 142. The abutting blocks 146 abuts against a bottom surface of the operation portion 544 of the locking member 54.

In detaching the expansion card 30 from the expansion slot 50, the operation portions 18 of each latching member 10 is pressed toward each other, with the deformed extension plates 162 away from each other, until the latching blocks 164 are disengaged from the fixing portion 53. The resilient portions 144 are restored to drive the abutting blocks 146 to disengage from the corresponding operation portions 54. The abutting plates 14 are rotated away from the fixing portions 53. The operation portions 544 of the locking members 50 are operated to rotate the locking members 50 out. The projections 542 are disengaged from the corresponding cutouts 34. The expansion card 30 is ready to be removed from the expansion slot 50.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A latching member for latching an expansion card to an expansion slot mounted with a locking member at an end of the expansion slot, the latching member comprising:
    an abutting plate pivotably mounted to the end of the expansion slot and locating at a side of the locking member opposite to the expansion slot;
    an abutting block extending from the abutting plate to abut against a bottom of the locking member; and
    two resilient hooks extend from two opposite sides of the abutting plate away from the abutting block to latch the expansion slot; and
    a connecting plate slantingly extending from a first end of the abutting plate, and mounted to the end of the expansion slot, the abutting plate operable to rotate about a junction of the connecting plate and the abutting plate.

2. The latching member of claim 1, wherein the abutting block extends from a second end of the abutting plate opposite to the connecting plate, the hooks extend from the second end of the abutting plate, facing the connecting plate.

3. The latching member of claim 1, wherein each hook comprises a resilient extension plate extending from the abutting plate, and a latching block extending from the distal end of the extension plate facing the other hook.

4. The latching member of claim 3, wherein a guiding surface is formed on an outer side of each latching block, away from the abutting plate.

5. The latching member of claim 1, wherein a resilient portion slantingly extends from the abutting plate, facing the expansion slot, to abut against the expansion slot.

6. The latching member of claim 1, wherein two operation portions extend from the sides of the abutting plate, respectively, opposite to the hooks.

7. The latching member of claim 1, wherein an angle between the connecting plate and the abutting plate is greater than 90 degrees.

8. The latching member of claim 1, wherein the connecting plate defines a connecting hole, the end of the expansion slot extends through the connecting hole to fix the connecting plate to a motherboard.

9. A mounting apparatus for an expansion card, the mounting apparatus comprising:
    an expansion slot into which an edge connector of the expansion card is inserted;
    two locking members disposed at two opposite ends of the expansion slot for clamping opposite ends of the expansion card; and
    two latching members pivotably mounted to the ends of the expansion slot and locating at sides of the locking members opposite to the expansion slot, to detachably latch the corresponding ends of the expansion slot, thereby sandwiching the locking members with the ends of the expansion slot;
    wherein each latching member comprises:
    an abutting plate pivotably mounted to the end of the expansion slot and locating at the side of the locking member opposite to the expansion slot;
    an abutting block extending from the abutting plate to abut against a bottom of the locking member; and
    two resilient hooks extend from two sides of the abutting plate away from the abutting block to latch the expansion slot; and
    a connecting plate slantingly extending from a first end of the abutting plate, and mounted to the end of the expansion slot, the abutting plate is operable to rotate about a junction of the connecting plate and the abutting plate.

10. The mounting apparatus of claim 9, wherein the abutting block extends from a second end of the abutting plate opposite to the connecting plate, the hooks extend from the second end of the abutting plate, facing the connecting plate.

11. The mounting apparatus of claim 10, wherein each hook comprises a resilient extension plate extending from the abutting plate, and a latching block extending from the distal end of the extension plate facing the other hook.

12. The mounting apparatus of claim 11, wherein a guiding surface is formed on an outer side of each latching block, away from the abutting plate.

13. The mounting apparatus of claim 10, wherein a resilient portion slantingly extends from the abutting plate, to abut against the locking member.

14. The mounting apparatus of claim 10, wherein two operation portions extend from the sides of the abutting plate, opposite to the hooks.

15. The mounting apparatus of claim 10, wherein an angle between the connecting plate and the abutting plate is greater than 90 degrees.

16. The mounting apparatus of claim 10, wherein the connecting plate defines a connecting hole, a latching portion extends down from the end of the expansion slot to extend through the connecting hole, thereby fixing the connecting plate to a motherboard.

17. The mounting apparatus of claim 9, wherein the latching member are made in plastic.

18. An assembly comprising:
    a motherboard comprising an expansion slot mounted thereon, two fixing portions extending from opposite ends of the expansion slot;
    an expansion card comprising an edge connector formed on a bottom side of the expansion card to engage in the expansion slot;
    two locking members pivotably mounted to the fixing portions of the expansion slot for locking opposite ends of the expansion card; and two latching members pivotably sandwiched between the ends of the expansion slot and the motherboard to detachably latch the corresponding fixing portions of the expansion slot, thereby sandwiching the locking members with the ends of the expansion slot.

19. The assembly of claim 18, wherein each latching member comprises:
   an abutting plate pivotably mounted to the end of the expansion slot and locating at a side of the locking member opposite to the expansion slot;
   an abutting block extending from the abutting plate to abut against a bottom of the locking member; and
   two resilient hooks extending from the abutting plate away from the abutting block to latch the corresponding fixing portion.

* * * * *